United States Patent [19]

Lungu

[11] Patent Number: 4,880,206
[45] Date of Patent: Nov. 14, 1989

[54] MAGNETIC VALVE

[75] Inventor: Corneliu Lungu, Bühlertal, Fed. Rep. of Germany

[73] Assignee: Robert Bosch GmbH, Stuttgart, Fed. Rep. of Germany

[21] Appl. No.: 272,882
[22] PCT Filed: Mar. 19, 1987
[86] PCT No.: PCT/DE87/00119
§ 371 Date: Aug. 31, 1988
§ 102(e) Date: Aug. 31, 1988
[87] PCT Pub. No.: WO87/05981
PCT Pub. Date: Oct. 8, 1987

[30] Foreign Application Priority Data

Mar. 26, 1986 [DE] Fed. Rep. of Germany ....... 3610122

[51] Int. Cl.$^4$ .............................................. F16K 31/06
[52] U.S. Cl. ................................................ 251/129.21
[58] Field of Search .................................... 251/129.21

[56] References Cited

U.S. PATENT DOCUMENTS 3,529,806 9/1970 Kozel ............................. 251/129.21
3,669,315 6/1972 Kuckens ........................ 251/129.21
4,240,468 12/1980 Brand et al. ............... 251/129.21 X

FOREIGN PATENT DOCUMENTS

3416465 11/1985 Fed. Rep. of Germany .

Primary Examiner—Arnold Rosenthal
Attorney, Agent, or Firm—Michael J. Striker

[57] ABSTRACT

A magnetic control valve comprising inlet and outlet members, a valve seat, a closing member movable into sealing engagement with the valve seat upon actuation of a magnetic coil which has an opening therethrough through which the controlled medium flows, and includes a guide tube for guiding the closing member in said opening, which closing member also forms a magnetic armature of the magnet part of the magnetic valve.

21 Claims, 4 Drawing Sheets

MAGNETIC VALVE

BACKGROUND OF THE INVENTION

The invention relates to a magnetic valve comprising a valve seat and a closing member movable into a closing direction upon a magnetic field traversing a coil. It is known in such a valve (DE-OS 34 16 465) to separate a hydraulic portion including an inlet opening and a outlet opening, an annular valve seat and closing member, from a magnetic portion spatially. The magnetic portion is arranged above the hydraulic portion, and a magnet armature, which is attracted by a toroidal coil according to control, actuates the valve member via a valve stem. Therefore, in this known valve, it is necessary to change the flow direction of a medium from the valve, usually the cooling liquid of an internal combustion engine, in a twofold manner, since the valve part, with its closing member is arranged in an axial stacked arrangement with the armature of the magnet part and the liquid medium cannot also flow through the magnet part with armature after the valve member moves to its open position. Nevertheless, in this known valve which is suitable for use in a heating device for heating the passenger space of a motor vehicle having a liquid-cooled internal combustion engine, it must be ensured that no corrosion can occur above the hydraulic area, that is, in the magnet part from an air stream. Therefore, the valve stem a has a thoughbore and forms a duct for the cooling medium.

In addition, the known magnetic valve has a rather complicated construction since, to give a numerical example, no fewer than 18 element parts or components are required, and a considerable magnetic circulation and a correspondingly large expenditure of energy are required for controlling the magnet coil due to the transmission of force via the valve stem for switching the valve.

SUMMARY OF THE INVENTION

It is the object of the invention to provide a magnetic valve, which is preferably utilized as a hot water timing valve for use in heating devices in motor vehicles (in air-conditioning systems on the water side), and is resistant to wear, and function in a reliable manner while, at the same time, being substantially simplified structurally.

This object is achieved by providing a valve with a medium flow path within the coil and in which the closing member forms the magnet armature.

The magnetic valve according to the invention has the advantage that magnetic functions and functions relating to fluid mechanics are realized with the same elements by a simple coaxial construction based on a simple principle of operation and without use of springs.

The magnetic valve, according to the invention, can be drastically simplified structurally, since, to provide another comparison example in numerical values, only four parts or components are required, so that, in addition to a considerable reduction in cost, the structure is suitable for automatic assembly.

A gas or liquid medium from the magnetic valve need not be diverted in the direction of flow, and a single movable part of the magnetic valve which, according to the invention, simultaneously acts as a closing member and a magnet armature, is shaped so as to benefit flow in such a way that the majority of the pressure loss, which is very slight in any case (a total of only approximately 0.2 bar as seen via the valve), can be recovered again, practically without vortex losses, after passing the valve seat area; in other words, the higher flow velocity in the seat area, which occurs as kinetic energy of the fluid, is realized as a pressure gain downstream of the valve.

In addition, it is advantageous that a trouble-free operation also results when, considering the specific area of application of the magnetic valve in air-conditioning systems for motor vehicles and the like, a cooling mixture is contaminated with foundry sand, for example, or other and, also with fibrous agents.

Since the magnetic valve according to the invention is much smaller than known valves of this type because the previous axial stacked arrangement of the magnet part and the hydraulic part is eliminated not only a substantial reduction in weight (that is, to approximately only half the weight of known magnetic valves), but also a significant reduction of electric current consumption required for implementing switching operations (the theoretical closing force is approximately 2.5 times lower than in the conventional manner of construction is achieved).

A specially circumfluent shape of the magnet armature/closing member which particularly benefits flow and enables the member to freely move in its support within a predetermined distance without a prestressed a spring, which is subject to corrosion, results in favorable flow behavior of the flowing medium, but also simultaneously in a powerful magnetic circuit which closes when the magnet coil is actuated by reducing an air gap, whereby the closing member is simultaneously attracted to its seat by means.

Particularly advantageous is a possibility of using a magnetic valve according to the invention as a return valve without modifying the construction thereof, so that, for the same flow circulation, the magnetic valve according to the invention either releases or blocks the flow of the medium to be switched in one flow direction, according to the control, and automatically closes in the other flow direction.

The invention as to its construction so to its mode of operation, together with additional objects and advantages thereof, will be best understood from the following description of the preferred embodiment with reference to the accompanying drawings.

DESCRIPTION OF THE PREFERRED EMBODIMENTS

The basic idea of the invention consists in realizing magnetic functions and functions relating to fluid mechanics in a compact manner and concentrically to one another with the same elements, wherein the closing member, which controls flow of a fluid medium, simultaneously serves as a magnet armature for a magnet coil enclosing it, and, in addition to receiving the magnet yoke, or as part of same, the coil body takes over the supporting functions for the floating body and, in addition, extends directly into outer connection parts on both sides of the valve so that, e.g., hose connections or the like may be slipped on. The natural size of the magnetic valve, according to the invention and, therefore, also compactness of its construction, light weight, and low energy output for the switching processes, can be seen in FIG. 3, which shows a possible embodiment of a magnetic valve according to the invention at twice its actual size.

Figure 1:
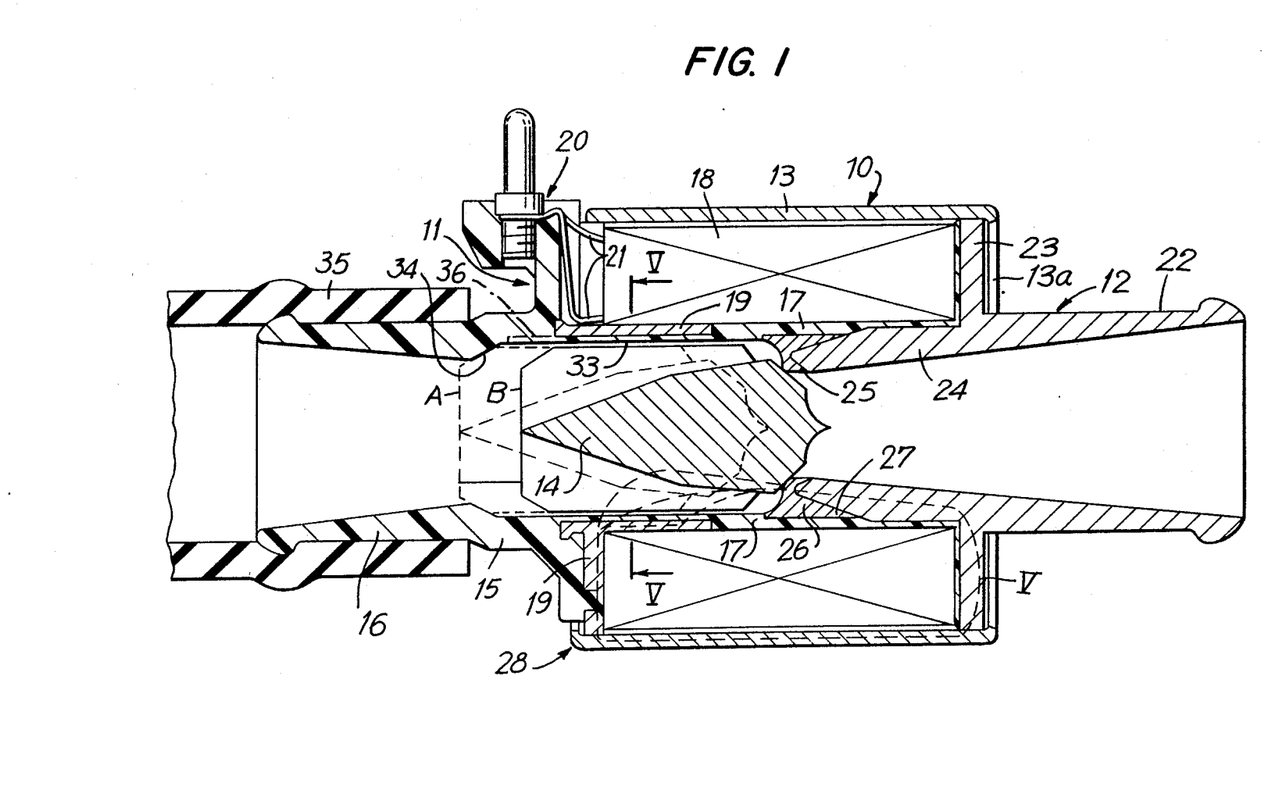
FIG. 1 shows an enlarged longitudinal cross-sectional view of the basic construction of a preferred embodiment of a magnetic valve according to the invention.

According to FIG. 1, a magnetic valve 10 is constructed from four main parts, namely, a first carrier part 11, a second carrier part 12, which is arranged opposite the latter, a metallic housing 13 which substantially encloses the magnet coil and also forms the magnetic return path, and a closing member 14 which simultaneously forms the part which is displaceable under the influences of magnetic forces, that is, a magnet armature.

The first carrier part comprises a molded part 15 which passes into the outlet connection piece 16 so as to form one piece. This carrier part 11 can, therefore, be designated in its entirety as an outlet piece. The carrier part 11 has, to the right of the drawing, an extension forming a coil body 17 which has generally a shape of a twisting roller and supports a coil 18. In the area of the coil body, a yoke part 19 consisting of magnetically conductive material of a corresponding permeability is embedded in the coil body. In addition, electrical plug-in connections, which are indicated at 20, are anchored in the material of the outlet piece, e.g. screwed in or cast in immediately during its production, the electrical connections 21 of the coil being guided to these electrical plug-in connections.

As shown in FIG. 1, the second carrier part 12 or inlet piece either is formed as a suitable metallic cast part or receives embedded yoke parts, which will be discussed below. In any case, the inlet piece likewise forms a one-piece inlet connection piece 22, a front wall 23 of which is in contact with an annular end wall of the coil body 17 and forms a part of the magnetic return path circuit. The carrier part 12 comprises a part 24 which projects inwardly is tapered, at the end thereof and forms a seat area 25 of the magnetic valve. In the embodiment shown in FIG. 1, area 25 is preferably formed from a prevulcanized elastomer ring material 26 and has a shape shown in FIG. 1, so that a good sealing effect with the closing member 14 is achieved.

The closing member 14 is shown in two positions in FIG. 1. In an open position A of the valve shown by a dashed line, and in a closed position B shown by a solid line.

After the inlet piece, is received in a is slide into the is slid into the stepped bore 27 of the outlet piece. The housing 13 is received over the latter and can rest against the annular wall 23 of the inlet piece with an inwardly projecting annular shoulder 13a and is secured at the other side, by a flange 28.

This is the basic construction of the valve, according to the invention, and before possibilities for its practical realization and its functions are discussed below. Ideas relating to fluid mechanics and electromagnetism which were acquired by tests (empirically), and also particularly shapes and behavior of seat and closing members would first be discussed with reference to FIGS. 2 and 3. A visual analysis of the flow behavior in a valve model shown schematically in FIG. 2 and made of transparent plastic material (Plexiglass) is determined by a cross-sectional configuration from the inlet connection piece to the outlet connection piece, as shown in FIG. 3. The valve model upon which the examination is based comprises an approximately tearshaped closing member/armature SA, whose shape could also be called blimb-shaped or bomb-shaped in general, which is arranged so as to be adjustable in a flow direction, e.g. with a stem. The floating body SA is positioned in an axially symmetrical manner in a Plexiglass pipe GR whose shape is selected in such a way, while taking into consideration the cross section of the closing member (in the open position of the valve), that the cross-section of a flow assumes the configuration III shown in FIG. 3 in the area of the closing member and after the latter.

The following description also contains, in part, numerical values which, of course, do not limit the invention, but rather are only indicated for reasons of improved understanding and clarity.

Figure 2:
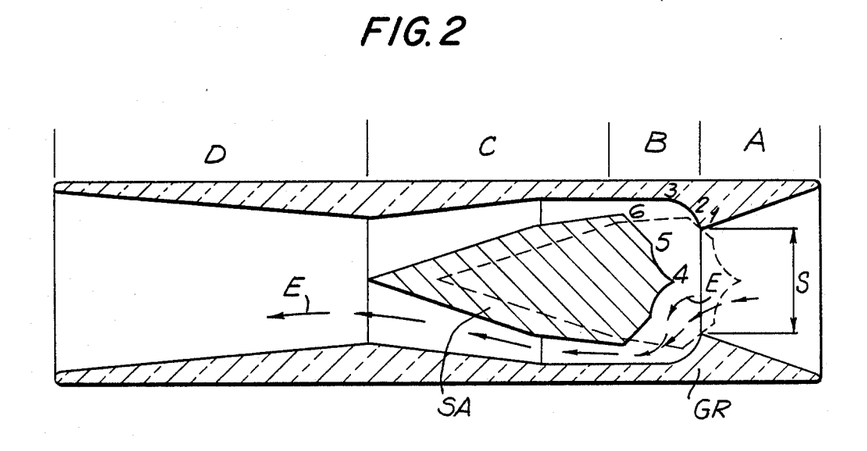
FIG. 2, shows a schematic model of fundamental flow-line patterns in a magnetic valve according to the invention.
Figure 3:
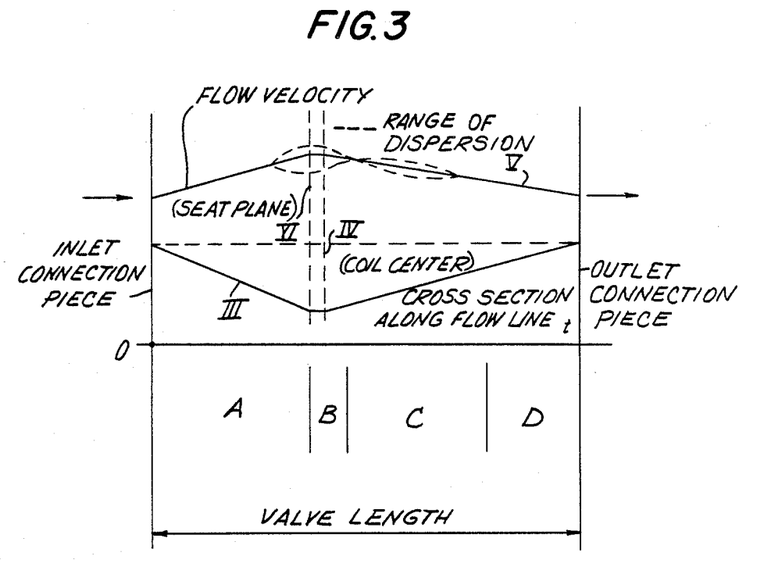
FIG. 3 shows a diagram of a flow pattern shown in FIG. 2.

The cross-sectional guiding area seen in FIG. 2 (as shown by an arrow E) is particularly favorable to flow and, at a seat diameter of 8 mm (0.5 cm$^2$), provides for pressure losses approximately equal to those with a seat diameter of 12.5 mm (1.23 cm$^2$) in a conventional magnetic valve. By displacing the closing member into the position of FIG. 2 shown in dashed lines, a reliable closing of the valve is achieved, wherein the theoretically determined closing forces are approximately 2.45 times smaller than in the conventional magnetic valve. Tests were carried out with water under conditions conforming to practice, wherein a water quantity of approximately 2,000 l/h was aimed for, which would lead to a pressure loss of only approximately 0.2 bar via the valve. The peculiarities of the flow guidance are explained by dividing the valve length into four portions A, B, C and D as shown in FIG. 2.

The inlet connection piece portion A (acceleration distance) forms an opening angle (preferably <35°) in a funnel-like manner and serves as a transition between the hose cross section and the seat diameter S of the valve. This area would, in itself, cause a pressure loss of approximately 0.5 bar.

The portion B forms the liquid jet gap and a closing and deflecting area, respectively, for the flow-line configuration in the seat area of the valve.

It must be taken into account that position 1 is the seat area and, therefore, has a shape which is adapted to the closing member. Therefore, in the same way, the distance 2-3 on the inside of the valve tube also only allows construction possibilities which do not exert a disruptive influence on the shape of the closing member.

The shape of the closing member in the area 4-5-6 (FIG. 2) has a substantial influence on pressure loss, closing force at the start of the lift and tightness of the valve. The fluid jet flows against the zone 4-5 frontally and is split by the latter in such a way that a flow is guided if possible, along the path 1-2-3 by a so-called Coanda effect. The liquid jet at the circumferential point 5 of the closing member SA is accordingly lifted from this surface, so that a relative vacuum pressure effect occurs in the annular area 5-6, which is capable of an important contribution to the reduction of the initial closing forces.

At point 6, the flow has a velocity which is approximately equal to that in the seat area.

In the entire portion B, a twofold deflection of the liquid jet is effected at high velocity (between distances 4-5 and 1-2-3, respectively); therefore, the density, dynamic viscosity and cavitation tendency of the liquid and, possibly of the alternative medium gas, are to be taken into account. A corresponding optimization of these areas 1-2-3 and 4-5-6 with the given conditions of the flowing medium is therefore advisable, also while taking into account its compressibility and state of impurity, in addition to viscosity and density.

Under these circumstances, the invention provides that under certain circumstances exchangeable closing members/magnet armatures can be used according to the medium to be conducted in each instance, so that changes are possible at the circumference 5, at the radius of the distance 4-5, and at the bevel of zones 5-6 (all bodies are symmetrical with respect to rotation) in order to ensure sealing conditions which are adapted to the medium and trouble-free switching behavior under the influence of the magnetic field under the respective conditions.

In portions C and D, the flow must decelerate to the velocity determined by the diameter of the adjoining line, with the least possible vortex losses. In so doing, the kinetic energy of the liquid is changed back into a pressure gain, so that the entire pressure loss of the valve is only 0.2 bar.

In addition, portion C, which is constructed in the schematic view of FIG. 2 so as to taper continuously until its transition to portion D, has the additional task of mechanically guiding the closing member and transmitting magnetic flow, respectively, which will be discussed in the following.

From the point of view of the magnetic function, the annular surface areas 1-2 and 5-6, respectively, which are located opposite one another, are constructed as attracting poles of an air gap, wherein, due to considerations relating to the electromagnetic efficiency, this gap is located approximately in the center of the coil, as indicated in IV in FIG. 3. The closing of the magnetic circuit along the shortest distance is then effected along the dashed line V in FIG. 1.

The portion A is formed in the practical embodiment according to FIG. 1 or FIG. 3 by the inlet piece (second carrier part 12 with hose connection piece), wherein the valve seat seal, which consists of a suitable rubber or elastomer, is arranged, preferably vulcanized on, at the left side of this inlet piece and is designated by 26 in FIG. 1 and shaped corresponding to zone 1-2-3 and simultaneously acts as a seal relative to the coil body 17. The inlet piece is preferably constructed as one piece, with the exception of the elastomer seal 26, which is vulcanized thereon. The rest of the requirements regarding shape with respect to magnetism and fluid mechanics, as follows from this model view, are then met by the outlet piece which is the first carrier part 11, and the closing member/magnet armature 14. The flow velocity resulting from the tear shape and the rest of the model construction of FIG. 2 is indicated in the diagram of FIG. 3 at V with a dashed curve which designates a range of dispersion for the adjoining portions A, B and C. The seat plane of the closing member extends in FIG. 3 at VI.

Figure 5:
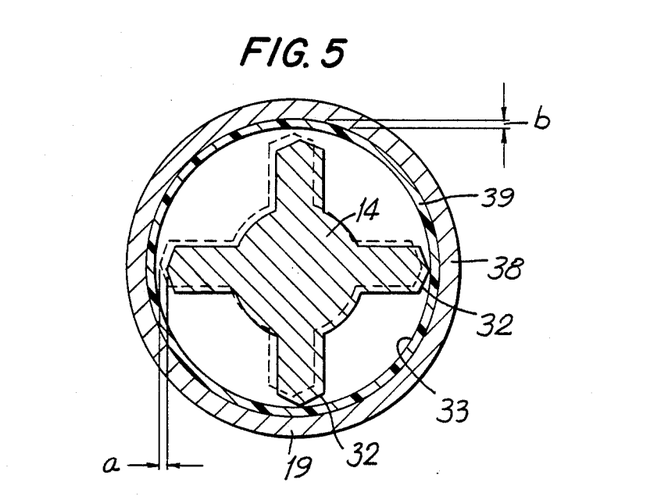
FIG. 5 shows an enlarged sectional view along the line V—V in FIG. 4.
Figure 6:
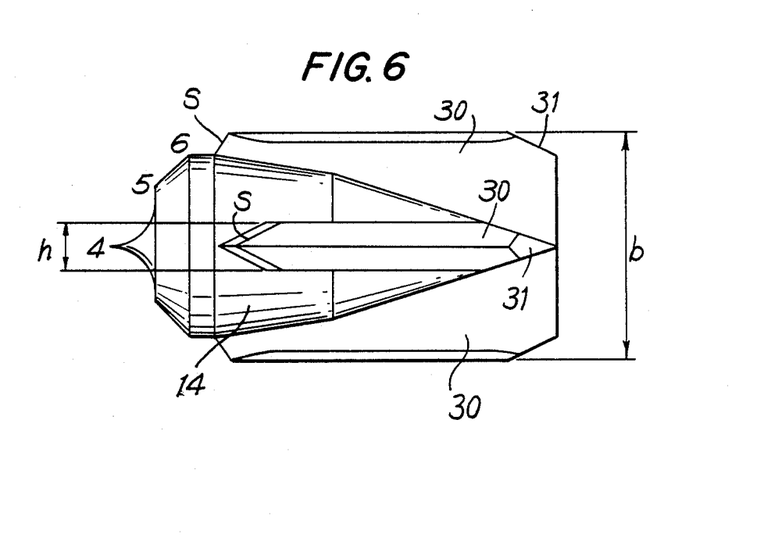
FIG. 6 shows an enlarged side view of the closing member/magnet armature of a magnetic valve according to the invention.
Figure 7:
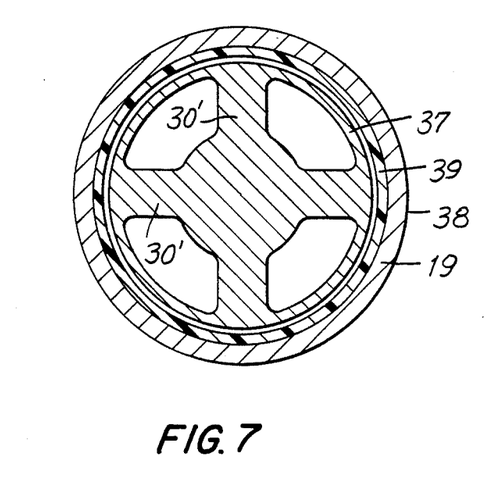
FIG. 7 shows an alternative embodiment of the closing member of a magnetic valve according to the invention in the area of its vanes.

In order to ensure dynamic movements of the closing member/magnet armature, its guidance and the magnetic return path, specifically while maintaining the tear shape in principle, guidance means are associated with the closing member/magnet armature in its form conforming to practice in the manner shown in FIGS. 1, 3 and 7, which guidance means are designated as guidance magnet guide vanes 30, and can best be seen in the view in FIG. 6 and the cross section shown of FIG. 5 and approximately resemble guide fins of a rocket. These guidance magnet guide vanes 30 are uniformly distributed around the outer surface of the closing member at equal angular distances, preferably 90°, so that there is a total of four vanes.

These vanes are constructed advantageously in such a way that they begin with a bevel S at a predetermined, preferably slight distance downstream of the bevel plane annular surface 5-6 of the closing member/magnet armature 14, so that e.g. fibrous impurities contained in the medium to be controlled do not cling to these vanes. The vanes extend linearly in the direction of flow, that is to the right in the drawing of FIG. 6, and thus (during rotation of the closing member 14), as an enveloping contour, have a cylindrical shape and are beveled again at their rear end at 31 before extending vertically to the center. Additional pressure losses are kept small by the bevels S and 31 in the inlet and outlet areas, respectively. However, for considerations relating to the magnetism, the strength or thickness h of the vanes (see FIG. 6) must be sufficient for providing a defined magnetic flux can result along the vanes without excessive resistance.

In addition, the vane profile bordering the inner wall of the guide tube of the closing member 14 (chiefly in portion C), which will be discussed further, is constructed in a roofed shaped manner, as can best be seen from the view in FIG. 5 at 32, so that it is also ensured that impurities contained in the fluid medium, for example, bodies of sand, exit in a practically compulsory manner from the gap between the vanes and the guide tube (which gap is still only linear in the roof shape).

Accordingly, in the area of the guide tube (portion C) for the closing member/magnet armature 14, as this area is called in the following or as designated by 33, a cylindrical inner wall of the guide tube corresponds to the cylindrical external shape of the vanes (as enveloping contour), which cylindrical inner wall is formed by the inner wall of the coil body (as part of the outlet piece). This cylindrical guide tube area continues in the direction of flow with a funnel-shaped zone 34 whose bevel can extend at approximately 25°. The corresponding ends 31 of the guide vanes 30, which are beveled in a correspondingly equiangular manner, are supported on this bevel at the end of the opening lift. Therefore, the impact of the closing member/magnet armature 14 during the opening of the valve is not frontal in this area 31/34, but diagonal, which is intercepted by means of an instantaneous radial expansion of the assigned plastic tube in this area. If it is ensured, in addition, that the hose connection piece is simultaneously arranged at the end of the coil body and sheathed by the rubber of a continuing hose 35, the impact energy of the opening valve is almost completely eliminated (favorable reduction of noise).

In spite of the tendency toward asymmetry of the attraction magnetic forces in the seat area and in spite of the play to be maintained by the closing member/magnet armature 14 for reasons relating to operation, this area from the valve seat to the outlet bevel 34 can be constructed in such a way that the sealing engagement with the valve seat, and the sliding guidance in end connection areas results in that upon a lift movement, the closing member/magnet armature 14 in the opening direction comes to a stop practically noiseless, an easy mechanical guidance is ensured in the axial direction also when the medium is highly contaminated (water and e.g. foundry sand), without occurrence of higher pressure losses, and the magnetic losses between the closing member/magnet armature 14 and the left-hand yoke piece 19 are as small as possible.

In so doing, a magnetically conductive tube piece can be embedded preferably in the coil body so as to adjoin the guidance pipe area 33; this tube piece is indicated in FIG. 1 by numeral 36 and forms an extension of the yoke piece 19 so that it contributes to ensuring the transmission of the magnetic flux along the entire length of the vane. Because of this, a lower overall induction results, and the system has lower losses.

From the point of view of magnetism, a construction, shown in the cross-sectional view of FIG. 7, is preferred. The vanes 30' effectively pass into a cylindrical shape at their outer end areas, which cylindrical shape can have the length of the vanes and is shown in FIG. 7 at 37. An air gap, which has a large surface area and, therefore, correspondingly low losses, results between this magnetically conductive pipe 37 and the yoke piece 19 or the magnetically conductive pipe piece 36, respectively. But, on the other hand, since technological considerations and considerations relating to fluid, in particular, must be taken into account in this case, particularly also inpurities, the free end area of the vane, as shown in the cross section of FIG. 5, is preferred.

It can also be seen from the view of FIG. 5 that the armature is normally supported laterally on two vanes in the guide tube. Therefore, additional distances "a" occur on the opposite side between the vane edges and the guide tube. The distance "a" is critical, respectively, because of the eccentricity of the armature, the non-uniformity of the magnetic flux at the vane edge and, under certain circumstances, a leakage in the seat area because of an eccentric placement of the cone on the valve seat. Therefore, it is attempted to keep the distance "a" small, wherein it must be taken into account that a jamming of the closing member/magnet armature 14 can occur in this area because of impurities (grains of sand). However, a reduction of the distance "a" below a given size of a grain of sand is possible without the risk of blockage if the vane profile is constructed in a roof-shaped manner, as already explained above.

It can be seen from the view of FIG. 1 that the inner wall of the coil body 17 directed to the coil 18 consists in this area of the tube like extension of the yoke piece 19 which is, therefore, coated externally with an insulating layer 38 (e.g. powder coating). In addition, a non-magnetic (plastic) layer of a predetermined thickness "b" (preferably between 0.4 and 0.5 mm) is located between the magnetic tube or extension of the yoke 19, or of the additional magnetically conductive tube piece 36, respectively, and the closing member/magnet armature 14 or its vane ends, respectively, so that a metallic contact is avoided between the magnetic guide tube on one hand, and the armature, on the other hand. Such a metallic contact, which occurs via contact points which are then simultaneously saturation zones of the magnetic circuit, could result in unfavorable friction conditions, wear and noise development. However, since this additional layer, which is designated by 39 in FIGS. 5 and 7, forms an additional air gap, its thickness must be kept small.

Figure 4:
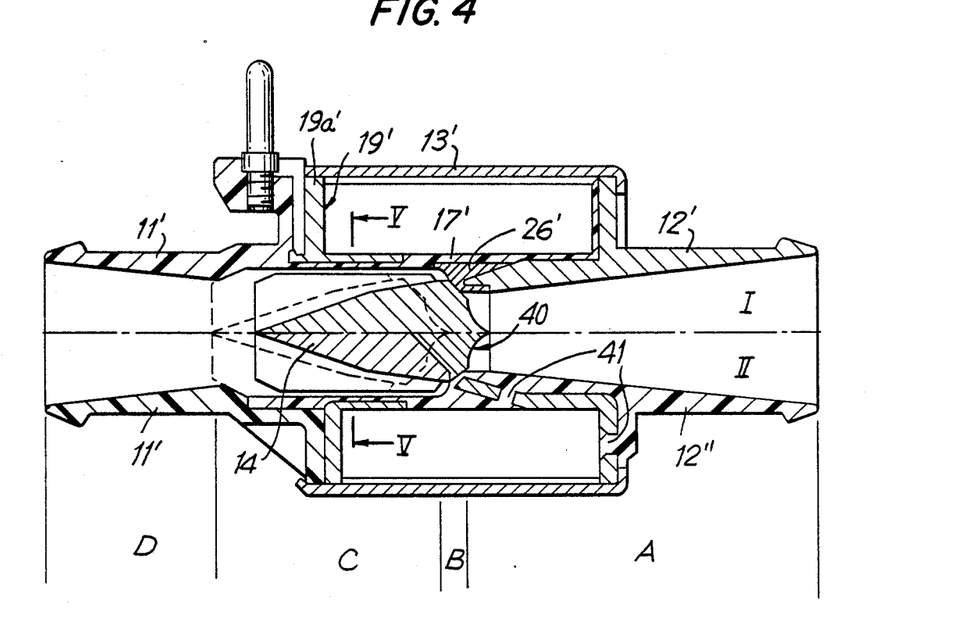
FIG. 4 shows a longitudinal cross-sectional combined view of two possible embodiments I and II of a magnetic valve according to the invention.

Advantageous constructions of the invention are shown in FIG. 4. A first embodiment I is indicated above the center axis, and a second embodiment II is indicated below the center axis.

In the embodiment I, the inlet piece 12' with a seat portion 26' thereon, is constructed separately from the rest of the components and is slid into the pipe opening of the coil body 17'. The entirety is then held together by the housing 13'. The inlet piece 12' is made of a suitable metallic work material with a corresponding magnetic permeability; the magnetic return path is effected via the housing 13' and the yoke 19' which generally has a tubular shape and comprises an annular outward flange 19a' which adjoins the housing casing 13'.

The seat portion 26' is vulcanized onto the inlet piece 12', with the seams (transition points between the) elastomer or rubber and the metal should be at a sufficient distance from the seat contact point so as to allow as few stresses as possible to occur at the seams.

In the embodiment I, the outlet piece 11', as already explained in general in FIG. 1, is a supporting plastic molded part with embedded yoke 19', wherein this plastic molded part also cooperates in forming the coil body 17'.

In contrast to this, the inlet piece 12" is a thicker supporting element in embodiment II and carries yoke parts, which are embedded in the latter and designated by 19", and simultaneously it forms the coil body for receiving the electrical coil. In embodiment II, it can be advantageous to arrange, e.g. to vulcanize on, the elastomer seal in the seat area on the closing member/magnet armature 14, as indicated at 40. This can be advantageous when a reduction in weight of the closing member/magnet armature 14 is important, for example, when the valve, according to the invention, is used as a return valve, for reducing the opening pressure. The embodiment II can also be made in such a way that the coil body comprises metallic yoke molded parts which are injected around with a corresponding plastic layer. This plastic layer must be kept as thin as possible in the pole area of the inlet piece 12", and it continues into the area of the inlet connection piece; accordingly, a good anchoring and stiffening results particularly in the area of the winding body due to perforations 41.

The housing 13' provides in its entirety for the ultimate tensile strength and connection strength of the valve and forms a kind of a force bridge which holds together the inlet piece and outlet piece parts.

When the coil 18 is excited, the closing member/magnet armature 14 (see FIG. 1) is attracted toward the inlet piece and then exercises sealing functions in the permanently excited state of the coil 18.

On the other hand, this sealing function can also be effected without electric current when the medium flows in one direction of and then is reversed (return valve). In such an application, it is advisable to assemble the valve vertically in such a way that the inlet piece is located below.

As soon as the coil 18 is deenergized the closing member/magnet armature 14 returns to the position shown in dashed lines in FIG. 1 in abutment at the bevel surface 34, so that a flow free of pressure losses to a great extent passes around.

While the invention has been illustrated and described as embodied in a magnetic valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A magnetic valve, particularly a two-way magnetic valve, for controlling flow of fluid medium in a device for heating passenger space in a vehicle having a liquid cooled internal combustion engine, or the like, said magnetic valve comprising an inlet member defining a valve inlet; an outlet member defining a valve outlet; a valve seat located between the valve inlet and the valve outlet; a closing member movable between an open position in which it is spaced from said valve seat, and a closed position in which it sealingly engages said valve seat; and magnet coil means for generating a magnet field for moving said closing member from said open position to said closed position, said magnet coil means including a coil body having an opening therethrough through which the medium flows, and a guide tube for guiding said closing member in its movements, said closing member forming a magnet armature for said magnet coil means, said valve seat having a seat annular surface, said closing member being progressively tapered in a streamlined manner in a flow direction of medium away from said seat annular surface, and said closing member being movable from the closed position thereof to the open position thereof only under action of one of flow forces and pressure forces generated by a medium flow.

2. A magnetic valve according to claim 1, wherein said inlet and outlet members define a flow path having an axis, and said closing member being substantially concentric relative to said axis.

3. A magnetic valve according to claim 1, wherein said magnet coil means and said closing member form a magnetic circuit and said coil body comprises a magnet yoke embedded into said coil body in a region of said guide tube for closing the magnet circuit.

4. A magnetic valve according to claim 1, wherein said magnet coil means and said closing member form a magnet circuit and said coil body comprises a magnet tube embedded in said coil body in a region of said guide tube for closing said magnet circuit.

5. A magnetic valve according to claim 1, wherein said magnet coil means and said closing member form a magnet circuit and said coil body comprises a magnet yoke and a magnet tube embedded in said coil body in a region of said guide tube for closing said magnet circuit.

6. A magnetic valve according to claim 1, wherein said closing member has a front pointed end facing the direction of flow, a rear pointed end, a concave annular surface extending from said front pointed end, and a straight-line taper annular surface extending from said concave annular surface to said rear pointed end in form of a tear.

7. A magnetic valve according to claim 6, wherein said guide tube has an inner cylindrical surface, and said closing member has a main body having an annular surface located adjacent said concave annular surface and includes a plurality of vanes symmetrically projecting from said main body and extending from said annular surface, and vanes having outer surfaces describing upon rotation of said closing member, a cylindrical surface corresponding to said inner cylindrical surface of said guide tube for enabling guidance of said closing member and transition of a magnetic flux between said magnetic coil means and said closing member 8. A magnetic valve according to claim 7, wherein said guide tube has an end bevel annular surface, and said vanes have a front inclined surface extending in the direction of flow and a rear bevel surface complimentary to said end bevel annular surface of said guide tube.

9. A magnetic valve according to claim 7, wherein each of said outer surfaces has a roof shape with an uppermost surface portion facing the guide tube.

10. A magnetic valve according to claim 7, wherein said closing member has an outer ring which is spaced from said main body of said closing member and has an outer surface complimentary to said inner cylindrical surface of said guide tube, said vanes extending between said outer ring and said main body.

11. A magnetic valve according to claim 7, wherein said outer surfaces of said vanes are spaced a predetermined distance from said inner cylindrical surface of said guide tube, the movement of said closing member being limited by said seat annular surface and said end bevel annular surface of said guide tube.

12. A magnetic valve according to claim 7, wherein said magnet coil means comprises a magnet yoke, and said coil body with said guide tube and said magnet yoke and said outlet member are formed as a single rear part, said coil body comprising an outer annular surface, said magnet yoke comprising a flange and being injection molded around said outer annular surface of said coil body, said valve seat being a part of said inlet member, said inlet member being received in said opening in said coil body and comprising a magnetically conductive material for closing the magnetic circuit.

13. A magnetic valve according to claim 12, wherein said magnet yoke comprises a projecting portion extending parallel to the direction of flow for improving magnetic conductivity in areas of said vanes.

14. A magnetic valve according to claim 12, wherein said rear part has an additional tube member for performing yoke functions at rear portions of said vanes.

15. A magnetic valve according to claim 1, wherein said inlet member has a front tapering end comprising an elastomeric seal.

16. A magnetic valve according to claim 5, wherein said guide tube has an inner cylindrical surface, and said tapering end has an end portion, said elastomeric seal being prevulcanized at used end portion and having an inwardly curved concave annular surface which passes into said inner cylindrical surface of said guide tube.

17. A magnetic valve according to claim 1, wherein said coil body is made of a metal material, said inlet member being injection molded around said coil body and said outlet member being injection molded around said inlet member.

18. A magnetic valve according to claim 1, further comprising a housing surrounding said magnet coil means and having opposite flange means for flanging said coil body.

19. A magnetic valve according to claim 18, wherein said inlet member is composed of a plastic material and includes embedded magnet yoke parts and has a seat portion, said closing member having an end portion formed of one of an elastomeric and rubber-like material for sealingly engaging said seat portion.

20. A magnetic valve according to claim 1, wherein said magnet coil means comprises a magnet yoke, said guide tube being a part of said magnet yoke and having an inner surface coated with a plastic layer.

21. A magnetic valve according to claim 1, wherein said guide tube has a portion defining said valve seat, said closing member having a portion engaging said valve seat, said portion of said guide tube and said portion of said closing member defining opposite attraction poles defining a magnetic air gap therebetween.

* * * * *